United States Patent
Li et al.

(10) Patent No.: US 10,525,431 B2
(45) Date of Patent: *Jan. 7, 2020

(54) COLD-WALL REACTOR FOR SUSPENSION-BED HYDROGENATION

(71) Applicant: Beijing Huashi United Energy Technology and Development Co., Ltd., Beijing (CN)

(72) Inventors: Lin Li, Beijing (CN); Lixin Guo, Beijing (CN); Chuntao Li, Beijing (CN)

(73) Assignee: Beijing Huashi United Energy Technology and Development Co., Ltd., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/785,887

(22) Filed: Oct. 17, 2017

(65) Prior Publication Data

US 2018/0133675 A1  May 17, 2018

(30) Foreign Application Priority Data

Oct. 17, 2016 (CN) .......................... 2016 1 0903636

(51) Int. Cl.
*B01J 8/00* (2006.01)
*B01J 8/18* (2006.01)
(Continued)

(52) U.S. Cl.
CPC . *B01J 8/22* (2013.01); *B01J 8/28* (2013.01); *B01J 2208/00495* (2013.01); *B01J 2208/00893* (2013.01); *B01J 2208/06* (2013.01)

(58) Field of Classification Search
CPC ........ B01J 8/00; B01J 8/18; B01J 8/20; B01J 8/22; B01J 8/28; B01J 2208/00–00017;
(Continued)

(56) References Cited

U.S. PATENT DOCUMENTS

2008/0269432 A1   10/2008   de Broqueville
2011/0167713 A1   7/2011    Quignard et al.
(Continued)

FOREIGN PATENT DOCUMENTS

CN   1307926 A   8/2001
CN   2538416 Y   3/2003
(Continued)

OTHER PUBLICATIONS

Machine translation of CN 204051658 U, which was published Dec. 31, 2014.*

(Continued)

*Primary Examiner* — Natasha E Young
(74) *Attorney, Agent, or Firm* — McCarter & English, LLP

(57) ABSTRACT

A cold-wall reactor for suspension-bed hydrogenation includes a reactor body including a reaction product outlet, cold hydrogen gas inlet and feed inlet. The reactor body includes a housing, surfacing layer and thermal insulation liner. An inner lining cylinder is fixedly arranged inside the reactor body with an outlet connected with the reaction product outlet. A side wall of the inner lining cylinder and an inner side wall of the reactor body define a cavity serving as a first circulation channel. A second circulation channel is arranged on the inner lining cylinder side wall. The inner lining cylinder communicates with the first circulation channel through the second circulation channel. In suspension-bed hydrogenation, material temperature is more uniform, reaction efficiency is improved, materials coking is reduced, thermal insulation liner issues are prevented, and the temperature of the outer wall of the reactor body is lower than the temperature of the medium.

14 Claims, 3 Drawing Sheets

(51) Int. Cl.
    *B01J 8/20*    (2006.01)
    *B01J 8/22*    (2006.01)
    *B01J 8/28*    (2006.01)

(58) Field of Classification Search
    CPC .... B01J 2208/00477; B01J 2208/00495; B01J 2208/00796; B01J 2208/00893; B01J 2208/06
    See application file for complete search history.

(56) References Cited

U.S. PATENT DOCUMENTS

| | | | | |
|---|---|---|---|---|
| 2015/0087038 A1* | 3/2015 | Utsunomiya | .......... | B01D 3/143 435/158 |
| 2018/0187103 A1* | 7/2018 | Li | .......... | C10G 67/02 |
| 2018/0230388 A1* | 8/2018 | Li | .......... | C10G 67/02 |

FOREIGN PATENT DOCUMENTS

| | | | |
|---|---|---|---|
| CN | 2548696 Y | | 5/2003 |
| CN | 2578321 Y | | 10/2003 |
| CN | 201351763 Y | | 11/2009 |
| CN | 102310005 A | | 1/2012 |
| CN | 103242871 A | | 8/2013 |
| CN | 204051658 U | * | 12/2014 |
| CN | 204051658 U | | 12/2014 |
| CN | 104388117 A | | 3/2015 |
| CN | 104588079 A | | 5/2015 |
| CN | 204752627 U | | 11/2015 |
| CN | 201610903636.6 | | 10/2016 |

OTHER PUBLICATIONS

Machine translation of CN 204051658 U, which was published on Dec. 31, 2014. (Year: 2014).*
Chinese Office Action dated May 7, 2019 for Chinese Application 201610903636.6 with English Translation.

* cited by examiner

COLD-WALL REACTOR FOR SUSPENSION-BED HYDROGENATION

CROSS REFERENCE TO RELATED APPLICATION

The present application claims priority to Chinese Patent Application Serial No. CN 201610903636, filed on Oct. 17, 2016.

TECHNICAL FIELD

The invention relates to the technical field of chemical equipment, in particular relates to a cold-wall reactor for suspension-bed hydrogenation.

BACKGROUND OF THE INVENTION

Suspension-bed hydrocracking technology is an important process in refining heavy oil to light oil. The primary difference between a suspension-bed reactor and a conventional hydrocracking fixed-bed reactor is that the catalyst in the suspension bed reactor is flowing. Currently, the commonly used hot-wall reactor for suspension-bed hydrocracking usually employs a hollow internal part-free barrel reactor. A mixture of raw oil material, hydrogen and catalyst enters the reactor from the bottom, flows upward, and flows out from the top of the reactor. However, since the wall temperature of the hot-wall reactor for suspension-bed hydrocracking is high, reaction materials inside thereof easily got coked on the side wall of the reactor, which affects the fluidity of the material inside the reactor. The process of the reaction is further impacted due to the uncertainty of catalyst is flowing and makes the operation of the reactor unstable.

Flow conditions of the gas-liquid-solid three-phases in the suspension reactor are an important indicator of the quality of reaction, which directly affects the conversion rate, the quality of the product and the running period. Because of the action of the wall effect, the fluid linear velocity of the reactor axis is relatively high, and the fluid linear velocity near the wall surface is relatively low, therefore the gas entering the reactor is not evenly distributed. Thus, the big bubble rises quickly in the process, and a short circuit occurs in the gas rising process. The occurrence of these two phenomena results in severe fluid back-mixing within the reactor, weakening of the interphase mass transfer and weakening of the heat transfer effect, which make it difficult to make uniform temperature distribution within the reactor, and lead to increased coke yield, decreased conversion rate, and seriously affected operational life of the reactor. As the suspension-bed reactor has higher requirements for the uniformity of the mixed raw materials, hydrogen and catalyst, it is required to fully mix raw materials, hydrogen gas and catalyst so that the hydrogen and the raw materials can fully react on the surface of the catalyst and the hydrogen can be quickly dissolved to the required raw materials, which make the hydrogenation occur. Therefore, the requirements of the mixing process are high. In addition, since the temperature of the reactor wall is high, the materials may easily aggregate and coke on the inner wall and the hydrogen may easily corrode the reactor wall, thus material requirements of the reactor cylinder are high.

For example, a Chinese patent, CN204051658U, discloses a hydrogenation reactor which comprises a reactor body and a support base. The reactor body comprises a vertically arranged cylinder body, and an upper seal head connected to the top of the cylinder and a lower seal head connected to the bottom of the cylinder. The upper seal head is provided with a discharge pipe, and the lower sealing head is provided with a feed pipe. Two connecting hydrogen pipes are vertically arranged at intervals on the side wall of the cylinder. Each of the cylinder body and the upper and lower head structure comprises in a sequence from outside to inside, a first metal shell, a first stainless steel corrosion-resistant layer, a first thermal insulating liner and a first steel liner. The first stainless steel anti-corrosion layer is arranged by overlay welding on the inner side wall of the first metal shell. The hydrogenation reactor is a cold-wall structure. The working temperature of the metal shell is much lower than the maximum working temperature limit of the material. A well-established chromium-molybdenum steel hydrogen corrosion resistant material can meet the working requirements. The inner wall of the metal shell is not provided with an anchoring nail, but is provided with a stainless steel anti-corrosion layer by overlay welding, and is provided with a steel liner on the inner sidewall of the thermal liner to avoid thermal liner fouling caused by reaction medium. Thus, this design meet the requirement of the hydrogen and hydrogen sulfide corrosion resistance, can break through the working temperature limit of the existing hydrogen corrosion resistant steel, provide the resistance to hydrogen and hydrogen sulfide and other medium corrosion. However, in the cold-wall hydrogenation reactor mentioned above, cold hydrogen gas can only enter the steel liner through limited number of inlets, which allows only limited amount of materials in the steel liner to contact the cold hydrogen, while the materials far away from the air inlet cannot be sufficiently mixed with cold hydrogen. As a result, the three-phase materials in the reactor is not mixed uniformly, the amount of cold hydrogen in different positions are different and temperature of the materials are different, which further leads to coking caused by local hot spots of the materials and impaired fluidity of the materials and the catalyst. The flowing of the catalyst in the reactor cannot be ensured, and the reaction efficiency is therefore low.

SUMMARY OF THE INVENTION

Thus, the present invention solves the technical problem that in the prior art, the suspension bed reactor is difficult to evenly mix the air, liquid and solid phases, together with the issues of uneven temperature, low reaction efficiency and easily coking. We present a suspension bed hydrogenation cold wall reactor by which gas, liquid and solid three-phase materials are uniformly mixed, the temperature is uniform, the reaction efficiency is high and coking is not easy to happen.

Therefore, in one aspect, the present invention provides a cold-wall reactor for suspension-bed hydrogenation, comprising a reactor body which is provided with a reaction product outlet arranged at the top thereof, a cold hydrogen gas inlet arranged on a side wall thereof and a feed inlet arranged at bottom thereof, and comprises, in a sequence from outside to inside thereof, a housing, a surfacing layer and a thermal insulation liner, and further comprises an inner liner cylinder which is fixedly arranged inside the reactor body and is provided with an outlet on top thereof and an inlet on bottom thereof, wherein the outlet of the inner liner cylinder is connected with the reaction product outlet in a sealing manner, and the inlet of the inner liner cylinder is communicated with the feed inlet, wherein a side wall of the inner lining cylinder and an inner side wall of the reactor body define a cavity serving as a first circulation channel, wherein a second circulation channel is arranged on the side wall of the inner lining cylinder, and wherein an interior of the inner lining cylinder is communicated with the first circulation channel through the second circulation channel.

Preferably, the second circulation channel of the cold-wall reactor comprise a plurality of gaps circumferentially extending along the side wall of the inner lining cylinder.

Preferably, a distance between the side wall of the inner lining cylinder and the inner side wall of the reactor body of the cold-wall reactor increases in a direction from top to bottom.

Preferably, the inner lining cylinder of the cold-wall reactor is provided with a first air hole arranged on its side wall corresponding to the cold hydrogen gas inlet, and a second air hole arranged on its side wall corresponding to the first air hole.

Preferably, the inner lining cylinder of the cold-wall reactor comprises a conical cylinder with its top being connected with the reaction product outlet in a sealing manner, and a plurality of annular cylinders arranged in a sequence from top to bottom below the conical cylinder, wherein the first circulation channel refers to the cavity defined by a side wall of the annular cylinder and the inner side wall of the reactor body, and wherein the second circulation channel comprises gap between the conical cylinder and the annular cylinder adjacent thereto and gap between two adjacent annular cylinders.

Preferably, a distance between the side wall of an annular cylinder located above the cold hydrogen gas inlet and the inner side wall of the reactor body of the cold-wall reactor is smaller than a distance between the side wall of an annular cylinder located below the cold hydrogen gas inlet and the inner side wall of the reactor body.

Preferably, the annular cylinder of the cold-wall reactor is provided with a first air hole arranged on its side wall corresponding to the cold hydrogen gas inlet, and a second air hole arranged on its side wall corresponding to the first air hole.

Preferably, the reactor body of the cold-wall reactor is a vertical cylinder body.

Preferably, the reactor body of the cold-wall reactor has a tapered inner bottom with its tip facing the feed inlet and its base facing the bottom of the inner liner cylinder.

Preferably, the reactor body of the cold-wall reactor is a metal housing which has a thickness of 60-300 mm, the surfacing layer has a thickness of 4-15 mm, the thermal insulation liner has a thickness of 100-200 mm, and the inner liner cylinder has a wall thickness of 5-15 mm.

The technical solutions of the invention have the following advantages:

(1) the cold-wall reactor for suspension-bed hydrogenation of the present invention comprises a reactor body which is provided with a reaction product outlet arranged at the top thereof, a cold hydrogen gas inlet arranged on a side wall thereof and a feed inlet arranged at bottom thereof, and comprises, in a sequence from outside to inside, a housing, a surfacing layer and a thermal insulation liner, and an inner liner cylinder which is fixedly arranged inside the reactor body and is provided with an outlet on top thereof and an inlet on bottom thereof, wherein the outlet of the inner liner cylinder is connected with the reaction product outlet in a sealing manner, and the inlet of the inner liner cylinder is communicated with the feed inlet, wherein a side wall of the inner lining cylinder and an inner side wall of the reactor body define a cavity serving as a first circulation channel, wherein a second circulation channel is arranged on the side wall of the inner lining cylinder, and wherein an interior of the inner lining cylinder is communicated with the first circulation channel through the second circulation channel.

In this way, an inner side wall of the reactor body define a cavity can server as the first circulation channel, and the second circulation channel is arranged on the side wall of the inner lining cylinder, so the cold hydrogen can enter the inner liner cylinder through different portions thereof when entering the reactor body, such that material distributed at different positions of the inner liner cylinder can get in contact with the cold hydrogen, thus ensuring well mixing of the material and cold hydrogen and well mixing of the three phases (liquid materials such as oils, solid materials such as catalyst and gas materials such as cold hydrogen) within the reactor. Therefore, the material temperature is more uniform and reaction efficiency is improved, and materials coking due to local hot spots is reduced. In addition, the cold hydrogen entering the reactor body can form a fluid layer of thermal insulation between the inner liner cylinder and the inner side wall of the reactor body, preventing the aggregation and coking of the material between the inner liner cylinder and the inner side wall of the reactor body, also preventing falling and damaging of the thermal insulation liner, and making the temperature of the outer wall of the reactor body lower than the temperature of the medium.

(2) The second circulation channel of the cold-wall reactor of the present invention comprises a plurality of gaps circumferentially extending along the side wall of the inner lining cylinder. In this way, the gaps are parallel to the direction of entering cold hydrogen and the cold hydrogen enter through the second circulation channel into the inner liner cylinder more easily.

(3) The inner lining cylinder of the cold-wall reactor of the present invention is provided with a first air hole arranged on its side wall corresponding to the cold hydrogen gas inlet, and a second air hole arranged on its side wall corresponding to the first air hole.

In this way, during the process of the cold hydrogen entering into the reactor body and then passing through the first air hole and the second air hole to the inner linear cylinder, the cold hydrogen will pass though large aperture firstly and then pass through small aperture so that the flow rate increases gradually.

At this moment, the static pressure energy of the fluid is converted to kinetic energy according to the Bernoulli equation, and the fluid flow rate is fastest while the pressure is minimum when the fluid is passing though the smallest aperture. The flow of the fluid in the second circulation channel of the inner liner cylinder forms disturbance, and the whole process realizes multi-disturbance inside the reactor, and the process of mixing of oil and hydrogen is completed rapidly, and also the uniform mixing of the catalyst particles and the oil is promoted.

(4) The inner lining cylinder of the cold-wall reactor of the present invention comprises a conical cylinder, with its top being connected with the reaction product outlet in a sealing manner, and comprises a plurality of annular cylinders, arranged in a sequence from top to bottom below the conical cylinder, wherein the first circulation channel refers to the cavity defined by a side wall of the annular cylinder and the inner side wall of the reactor body, and wherein the second circulation channel comprises gap between the conical cylinder and the annular cylinder adjacent thereto and gap between two adjacent annular cylinders. In this way, the sidewall of the inner lining cylinder is divided into a plurality of annular cylinders fixedly connected to the sidewall of the reactor body, such that material circulation inside the reactor can be realized, completing the process of rapid mixing with hydrogen, while also promoting the uniform mixing of catalyst particles and the oil.

(5) The distance between the side wall of an annular cylinder located above the cold hydrogen gas inlet of the cold-wall reactor and the inner side wall of the reactor body is smaller than the distance between the side wall of an annular cylinder located below the cold hydrogen gas inlet and the inner side wall of the reactor body. Since the cold hydrogen rises easily to the top of the reactor body due to the light mass thereof, the cold hydrogen entering through the cold hydrogen inlet will not rise easily by keeping the distance between the side wall of the annular cylinder located above the cold hydrogen gas inlet of the cold-wall reactor and the inner side wall of the reactor body smaller than the distance between the side wall of the annular cylinder located below the cold hydrogen gas inlet and the inner side wall of the reactor body. Therefore, a portion of the cold hydrogen will flow downwards along the first circulation channel such that the temperature of the lower portion of the outer wall of the reactor body can be kept lower than the medium temperature, and meanwhile the cold hydrogen can reach uniformly mixing with the materials in the lower portion of the reactor body such that the temperature of the materials in the lower portion of the reactor body is controlled.

(6) The reactor body of the cold-wall reactor is a metal housing which has a thickness of 60-300 mm, the surfacing layer has a thickness of 4-15 mm, the thermal insulation liner has a thickness of 100-200 mm, and the inner liner cylinder has a wall thickness of 5-15 mm.

The suspension bed reactor is designed to operate in high temperature, high pressure and hydrogen environment by designing the thickness of the housing of the reactor body, the surfacing layer, the thermal insulation liner and the inner liner cylinder. And the outer metal wall temperature of the reactor body is ensured to be lower than the temperature of the materials in the reactor so as to avoid the corrosion of the reactor housing.

BRIEF DESCRIPTION OF THE DRAWINGS

To illustrate the embodiments of the present invention or the technical solution of the prior art more clearly, the drawings used in specific embodiments or the prior art are briefly described below. Apparently, the drawings in the following description are some embodiments of the present invention, and according to these drawings, an ordinary skilled person in the art can obtain other drawings without paying any creative effort.

Figure 1:
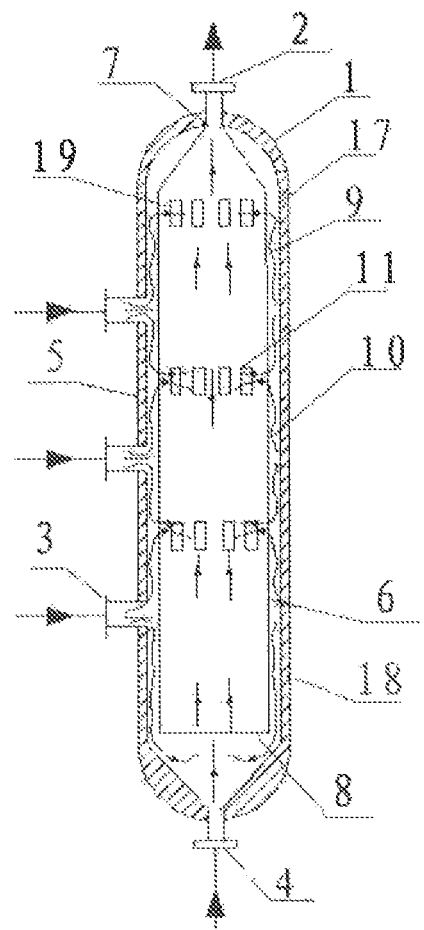
FIG. 1 is a structural schematic diagram of the cold-wall reactor for suspension-bed hydrogenation of embodiment 1 of the present invention.

1—reactor body, 2—reaction product outlet, 3—cold hydrogen gas inlet, 4—feed inlet, 5—housing, 6—inner liner cylinder, 7—outlet, 8—inlet, 9—cavity, 10—first circulation channel, 11—second circulation channel, 12—gaps, 13—first air hole, 14—second air hole, 15—conical cylinder, 16—annular cylinder, 17—thermal insulation liner, 18—surfacing layer, 19—through hole, 20—support.

DETAILED EMBODIMENTS

In order to make the contents of the present invention more easily to understand, the present invention is further described in detail with reference to specific embodiments and with the accompanying drawings. Apparently, the aforementioned embodiments are merely parts of the embodiments but not all. Any embodiments obtained without creative labor by the person skilled in the art are embraced within the protection scope of the present invention.

In the specification, unless specified or limited otherwise, relative terms such as "central", "up", "below", "left", "right", "vertical", "horizontal", "inner" and "outer" should be construed to refer to the orientation as then described or as shown in the drawings under discussion. These relative terms are for convenience of description and do not require that the present invention be constructed or operated in a particular orientation. In addition, terms such as "first", "second" and "third" are used herein for purposes of description and are not intended to indicate or imply relative importance or significance.

In the description of the present invention, it should be understood that, unless specified or limited otherwise, the terms "mounted," "connected," and "coupled" are used in a broad sense and encompass such as fixedly connected or detachably connected or integrally connected, mechanically or electrically connected, can be directly connected or indirectly connected through an intermediate medium or the two elements are internal connected, which can be understood by those skilled in the art according to the detail embodiment of the present invention.

In addition, the technical features in different embodiments can be combined with each other as long as no conflict exists of the invention described below.

Embodiment 1

Provided is a cold-wall reactor for suspension-bed hydrogenation of the present invention, showed as in the FIG. 1 (arrow in the figure showing the flow direction of the materials or flow direction of the cold hydrogen). The cold-wall reactor comprises a reactor body 1, which is provided with a reaction product outlet 2 arranged at the top thereof, a cold hydrogen gas inlet 3 arranged on a side wall thereof and a feed inlet 4 arranged at bottom thereof. The reactor body 1 comprises, in a sequence from external to internal, a housing 5, a surfacing layer 18 and a thermal insulation liner 17, and an inner liner cylinder 6 which is fixedly arranged inside the reactor body 1. In this embodiment, the fixed connection of the inner liner cylinder 6 is achieved by arranging an outlet 7 on top of the inner liner cylinder 6 and connecting the outlet 7 with the reaction product outlet 2 in a sealing manner. The inner liner cylinder 6 is provided with an inlet 8 on bottom thereof, and the inlet 8 is communicated with the feed inlet 4. A side wall of the inner lining cylinder 6 and an inner side wall of the reactor body 1 define a cavity 9 serving as a first circulation channel 10. A second circulation channel 11 is arranged on the side wall of the inner lining cylinder 6. The second circulation channel 11 comprises a plurality of rectangle through-holes 19 arranged on the side wall of the inner liner cylinder 6, and an interior of the inner lining cylinder 6 is communicated with the first circulation channel 10 through the through-holes 19.

By providing the reactor body 1 with the inner lining cylinder 6 and defining the cavity 9 between the inner lining cylinder 6 and the inner side wall of the reactor body 1 as the first circulation channel 10, and arranging on the inner liner cylinder 6 a plurality of the rectangle through-holes 19 as the second circulation channel 11, when materials enter the reactor body 1 through the feed inlet 4, it enters into the inner liner cylinder 6 and flows upwards. Cold hydrogen is introduced through the cold hydrogen gas inlet 3 and enters into the first circulation channel 10, and flows upward or downward along the first circulation channel 10. During flowing, the cold hydrogen passes through the second circulation channel 11 to enter the inner liner cylinder 6 and uniformly mixes with the materials in the inner liner cylinder 6. Because there are a plurality of rectangle through-holes 19 arranged on the side wall of the inner liner cylinder 6, the cold hydrogen enters into the inner liner cylinder 6 through different positions so that the cold hydrogen can mix with the materials more uniformly in the inner liner cylinder 6 and thus a uniform temperature of the materials can be ensured. In the aforementioned process, the cold hydrogen that enters the reactor body 1 can form a thermo-insulation fluid layer between the inner wall of the reactor body 1 and the inner liner cylinder 6, which prevents aggregation and coking of the materials between the inner liner cylinder 6 and the inner wall of the reactor body 1, and also prevents the damage and falling off of the thermal insulation liner 17 and keeps the outside wall temperature of the reactor body 1 lower than the temperature of the medium.

Embodiment 2

Figure 2:
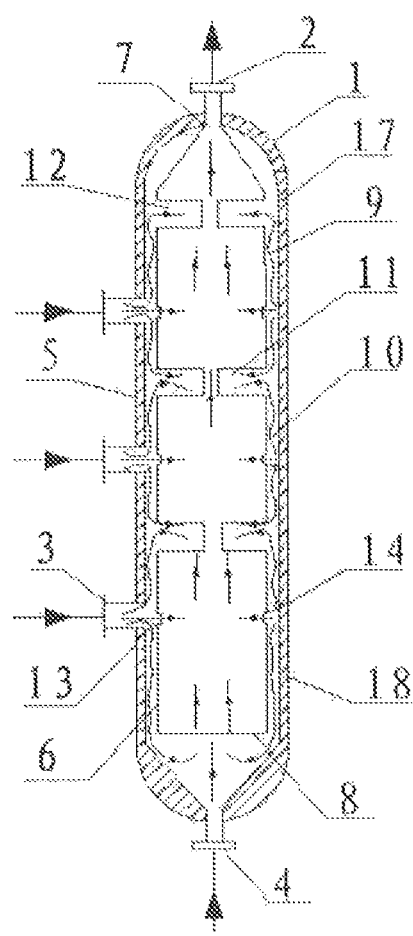
FIG. 2 is a structural schematic diagram of the cold-wall reactor for suspension-bed hydrogenation of embodiment 2 of the present invention.

Provided is a cold-wall reactor for suspension-bed hydrogenation of the present invention, showed as in the FIG. 2 (arrow in the figure shows the flow direction of the materials or flow direction of the cold hydrogen). The cold-wall reactor comprises a reactor body 1 which is provided with a reaction product outlet 2 arranged at the top thereof, cold hydrogen gas inlets 3 arranged on a side wall thereof. The reactor body 1 is a vertically arranged cylinder body which is provided with 3 cold hydrogen gas inlets at same intervals from the top to the bottom on one side of the wall of the reactor body 1. The reactor body 1 is provided with a feed inlet 4 arranged at bottom thereof, and comprises, in a sequence from outside to inside thereof, a housing 5, a surfacing layer 18 and a thermal insulation liner 17, and an inner liner cylinder 6. The inner liner cylinder 6 is fixedly arranged inside the reactor body 1 and is provided with an outlet 7 on top thereof. The outlet 7 is connected with the reaction product outlet 2 of the reactor body 1 in a sealing manner, thus realizing fixing of the inner liner cylinder 6. The bottom of the reactor body 1 has a tapered structure with its tip facing the feed inlet 4 and its base facing the bottom of the inner liner cylinder 6, which facilitates the entering of the materials from the feed inlet 4 into the inner lining cylinder 6. The outlet 7 on the top of the inner liner cylinder 6 is communicated with the reaction product outlet 2. The inner liner cylinder 6 is provided with an inlet 8 on bottom thereof, and the inlet 8 is communicated with the feed inlet 4. A side wall of the inner lining cylinder 6 and an inner side wall of the reactor body 1 define a cavity 9 serving as a first circulation channel 10. The distance between the side wall of the inner liner cylinder 6 and the inner side wall of the reactor body 1 increase incrementally from the top to the bottom, that is to say the first circulation channel 10 is enlarged gradually from the top to the bottom. The side wall of the inner liner cylinder 6 is provided with a second circulation channel 11 which comprises a plurality of gaps 12 circumferentially extending along the side wall of the inner liner cylinder 6. The interior of the inner liner cylinder 6 is communicated with the first circulation channel 10 via the gaps 12. The inner liner cylinder 6 is provided with a first air hole 13 arranged on its side wall corresponding to the cold hydrogen gas inlet 3, and a second air hole 14 arranged on its side wall corresponding to the first air hole 13. In the present embodiment, the reactor body 1 is a vertically arranged cylinder body, and the shell 5 is a metal shell having a wall thickness of 60 mm. The surfacing layer 18 is 4 mm, the thermal insulation liner 17 has a thickness of 100 mm and the inner liner cylinder 6 has a wall thickness of 5 mm.

Since the cold hydrogen phase is lighter than the materials, it is easier to flow up such that the materials in the upper portion of the reactor body 1 tends to be mixed with more cold hydrogen than the materials in the lower portion of the reactor body 1. In this embodiment, by arranging the distance between the side wall of the inner liner cylinder 6 and the inner side wall of the reactor body 1 to incrementally increase from the top to the bottom, the first circulation channel 10 is enlarged gradually from the top to the bottom, such that enough cold hydrogen is ensured to enter into the lower portion of the reactor body 1, allowing the materials in the reactor body 1 to be mixed thoroughly with the cold hydrogen, which uniforms the temperature of the materials. To make the cold hydrogen easily pass through the second circulation channel 11 and enter to the inner liner cylinder 6, the second circulation channel 11 is designed to comprise a plurality of gaps 12 that extend circumferentially in the side wall of the inner liner cylinder 6. The gaps 12 are parallel to the entering direction of the cold hydrogen, such that it is easy for the cold hydrogen to enter the inner liner cylinder 6 though the gaps 12. By providing the inner liner cylinder 6 with a first air hole 13 on its side wall corresponding to the cold hydrogen gas inlet 3 and a second air hole 14 on its side wall corresponding to the air hole 13, When the cold hydrogen enters the reactor body 1, it flows and passes through the first circulation channel 10, the first air hole 13 and the second air hole 14 to enter the inner liner cylinder 6, and such a flow process accompanies change of apertures from large to small, so flow rate gradually increases, such that the fluid static pressure energy of the cold hydrogen transform to kinetic energy. When the cold hydrogen passes through the smallest aperture, the flow rate is the fastest and the pressure is the minimum, and the cold hydrogen between the inner liner cylinder 6 and the reactor body 1 flows due to pressure decrease around the first air hole 13 and the second air hole 14, and such a flow generates disturbance at the gaps 12 of the inner liner cylinder 6 and the whole process realizes disturbance flow at multiple sections inside the reactor, which rapidly facilitates the mixing of the hydrogen in the oil phase, and promotes the well mixing of oil phase and the catalyst particles.

Embodiment 3

Figure 3:
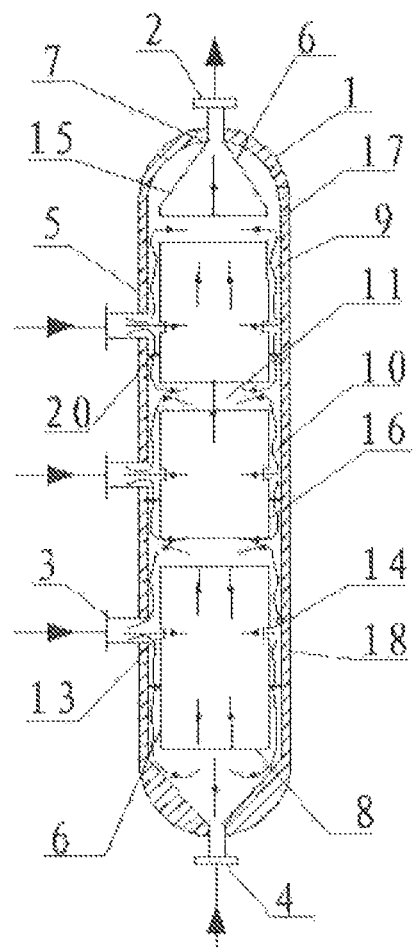
FIG. 3 is a structural schematic diagram of the cold-wall reactor for suspension-bed hydrogenation of embodiment 3 of the present invention.

Provided is a cold-wall reactor for suspension-bed hydrogenation of the present invention, showed as in the FIG. 3 (arrow in the figure shows the flow direction of the materials or flow direction of the cold hydrogen). The cold-wall reactor comprises a reactor body 1 which is provided with a reaction product outlet 2 arranged at the top thereof, a cold hydrogen gas inlet 3 arranged on a side wall thereof and a feed inlet 4 arranged at bottom thereof, and comprises, in a sequence from external to internal, a housing 5, a surfacing layer 18 and a thermal insulation liner 17, and an inner liner cylinder 6 which is fixedly arranged inside the reactor body 1. In the present embodiment, the inner liner cylinder 6 comprises a conical cylinder 15 and a plurality of annular cylinders 16. The conical cylinder 15 is internally communicated with the annular cylinder 16. An outlet 7 is arranged on the top of the conical cylinder 15 and is connected with the reaction product outlet 2 in a sealed manner. The plurality of the annular cylinders 16 are arranged from the top to the bottom below the conical cylinder 15. The side wall of the annular cylinder 16 is fixed to the inner side wall of the reactor body 1 through a fixing mechanism. The fixing mechanism is a bracket 20 arranged on the inner sidewall of the reactor body 1. The inner liner cylinder 6 is fixedly connected with the bracket 20 to realize the fixation of the inner liner cylinder 6. The side wall of the annular cylinder 16 and an inner side wall of the reactor body 1 define a cavity 9 serving as a first circulation channel 10. The gap between the conical cylinder 15 and its adjacent annular cylinder 16 and the gap between two adjacent annular cylinders 16 constitute the second circulation channel 11. The bottom of the lowest annular cylinder 16 is communicated with the feed inlet 4. The distance between the side wall of the annular cylinder 16 located above the cold hydrogen gas inlet 3 and the inner sidewall of the reactor body 1 is less than the distance between the side wall of the annular cylinder 16 located below the cold hydrogen gas inlet 3 and the inner side wall of the reactor body 1. The annular cylinder 16 is provided with a first air hole 13 arranged on its side wall corresponding to the cold hydrogen gas inlet 3, and a second air hole 14 arranged on its side all corresponding to the first air hole 13. In the present embodiment, the reactor body 1 is a vertically arranged cylinder, and the shell 5 is a metal shell which has a wall thickness of 300 mm. The surfacing layer 18 is 15 mm, the thermal insulation liner 17 has a thickness of 200 mm and the inner liner cylinder 6 has a wall thickness of 15 mm.

In is embodiment, the inner liner cylinder 6 is designed to comprise a conical cylinder 15 and a plurality of annular cylinders 16, the conical cylinder 15 is arranged in the top portion of the inner liner cylinder 6 and the top of the conical cylinder 15 is connected to the reaction product outlet 2 in a sealing manner, such that it facilitates the materials in the inner liner cylinder 6 to be transported out through the conical cylinder 15 and the reaction product outlet 2 and enter subsequent equipment. The side wall of the inner liner cylinder 6 is designed to comprise a plurality of the annular cylinders 16 arranged from the top to the bottom, and the gap between the conical cylinder 15 and its adjacent annular cylinder 16 and the gap between two adjacent annular cylinders 16 constitute the second circulation channel 11, so that the gaps form a ring around the side wall of the inner liner cylinder 6, and the ring serves as the second circulation channel 11 in the inner liner cylinder, and the cold hydrogen flow between the inner liner cylinder 6 and the reactor body 1 generate strong disturbance at the second circulation channel 11 due to the reduced pressure around the first air hole 13 and the second air hole 14. In addition, since there is a plurality of annular cylinders 16, a plurality of second circulation channels 11 are formed and thus disturbance flow occurs at multi-sections inside the reactor, which rapidly facilitates the mixing of the hydrogen in the oil phase, and promotes the well mixing of oil phase and the catalyst particles. Moreover, the distance between the side wall of the annular cylinder 16 located above the cold hydrogen gas inlet 3 and the inner wall of the reactor body 1 is smaller than the distance between the side wall of the annular cylinder 16 located below the cold hydrogen gas inlet 3 and the inner wall of the reactor body 1, such that it ensures the first circulation channel 10 gradually becomes larger from the top to the bottom, allowing part of the cold hydrogen to flow toward the bottom of the reactor body 1 to ensure enough cold hydrogen can be introduced into the lower portion of the reactor body 1, thus ensuring thoroughly mixing of the cold hydrogen with the materials in the lower portion of the reactor body 1 and ensuring uniform temperature of the materials. The annular cylinder 16 is provided with a first air hole 13 on its side wall corresponding to the cold hydrogen gas inlet 3, and a second air hole 14 on its side wall corresponding to the first air hole 13, such that when the cold hydrogen enters the annular cylinder 16 through the first air hole 13 and the second air hole 14, its passes through apertures from large to small, thus allowing gradual increase of flow rate, and during this process the fluid static pressure energy of the cold hydrogen is transformed to kinetic energy. When the cold hydrogen passes through the smallest aperture, the flow rate is the fastest and the pressure is the minimum, and the cold hydrogen between the inner liner cylinder 6 and the reactor body 1 flows due to pressure decrease around the first air hole 13 and the second air hole 14, generating cold hydrogen disturbance at the second circulation channel 11 and facilitating the mixing of the materials and the cold hydrogen.

The suspension bed hydrogenation cold wall reactor operates as follows. Materials (such as liquid oil phase, solid catalyst and hydrogen dissolved in the oil phase) enter the reactor body 1 though the feed inlet 4 and then enter the inner liner cylinder 6 where the materials is mixed with cold hydrogen that enters through the cold hydrogen gas inlet 3, the first circulation channel 10 and the second circulation channel 11 or through the first air hole 13 and the second air hole 14. The materials in the inner liner cylinder 6 rise, pass several of the second circulation channels 11 on the inner liner cylinders 6, mix with the cold hydrogen that passes through the second circulation channels 11, and flow into the inner liner cylinder 6 and flow out through the reaction product outlet 2, which realizes the thoroughly mixing between the materials and the cold hydrogen flow, ensures the uniform temperature of the materials in the inner liner cylinder 6, reduces the material coking due to local overheat, ensures the flow status of the catalyst in the reactor and increases the efficiency of the reaction. In the aforementioned process, the cold hydrogen that enters the reactor body 1 can form a thermal-insulation fluid layer between the inner liner cylinder 6 and the inner sidewall of the reactor body 1, which prevents aggregation and coking of the materials between the inner liner cylinder 6 and the inner sidewall of the reactor body 1, and also prevents the damage and falling off of the thermal insulation liner 17 and keeps the outside wall temperature of the reactor body 1 lower than the temperature of the materials inside the reactor, which prevents the corrosion of the outer wall of the reactor body 1 and reduces the requirement of the materials for the reactor.

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. A cold-wall reactor for suspension-bed hydrogenation, comprising
    a reactor body (1), which is provided with a reaction product outlet (2) arranged at the top thereof, a cold hydrogen gas inlet (3) arranged on a side wall thereof and a feed inlet (4) arranged at bottom thereof, and comprises, in a sequence from outside to inside thereof, a housing (5), a surfacing layer (18) and a thermal insulation liner (17), and an inner liner cylinder (6), which is fixedly arranged inside the reactor body (1) and is provided with an outlet (7) on top thereof and an inlet (8) on bottom thereof, wherein the outlet (7) of the inner liner cylinder (6) is connected with the reaction product outlet (2) in a sealing manner, and the inlet (8) of the inner liner cylinder (6) is communicated with the feed inlet (4), wherein a side wall of the inner liner cylinder (6) and an inner side wall of the reactor body (1) define a cavity (9) serving as a first circulation channel (10), wherein a second circulation channel (11) is arranged on the side wall of the inner liner cylinder (6), and wherein the second circulation channel (11) comprises a plurality of gaps (12) circumferentially extending along the side wall of the inner liner cylinder (6), and wherein an interior of the inner liner cylinder (6) is communicated with the first circulation channel (10) through the second circulation channel (11).

2. The cold-wall reactor according to claim 1, wherein a distance between the side wall of the inner liner cylinder (6) and the inner side wall of the reactor body (1) increases in a direction from top to bottom.

3. The cold-wall reactor according to claim 2, wherein the inner liner cylinder (6) is provided with a first air hole (13) arranged on its side wall corresponding to the cold hydrogen gas inlet (3), and a second air hole (14) arranged on its side wall corresponding to the first air hole (13).

4. The cold-wall reactor according to claim 2, wherein the inner liner cylinder (6) comprises
 a conical cylinder (15), with its top being connected with the reaction product outlet (2) in a sealing manner, and
 a plurality of annular cylinders (16), arranged in a sequence from top to bottom below the conical cylinder (15),
 wherein the first circulation channel (10) refers to the cavity (9) defined by a side wall of the annular cylinder (16) and the inner side wall of the reactor body (1), and
 wherein the second circulation channel (11) comprises gap between the conical cylinder (15) and the annular cylinder (16) adjacent thereto and gap between two adjacent annular cylinders (16).

5. The cold-wall reactor according to claim 4, wherein a distance between the side wall of an annular cylinder (16) located above the cold hydrogen gas inlet (3) and the inner side wall of the reactor body (1) is smaller than a distance between the side wall of an annular cylinder (16) located below the cold hydrogen gas inlet (3) and the inner side wall of the reactor body (1).

6. The cold-wall reactor according to claim 1, wherein the inner liner cylinder (6) is provided with a first air hole (13) arranged on its side wall corresponding to the cold hydrogen gas inlet (3), and a second air hole (14) arranged on its side wall corresponding to the first air hole (13).

7. The cold-wall reactor according to claim 6, wherein the inner liner cylinder (6) comprises
 a conical cylinder (15), with its top being connected with the reaction product outlet (2) in a sealing manner, and
 a plurality of annular cylinders (16), arranged in a sequence from top to bottom below the conical cylinder (15),
 wherein the first circulation channel (10) refers to the cavity (9) defined by a side wall of the annular cylinder (16) and the inner side wall of the reactor body (1), and
 wherein the second circulation channel (11) comprises gap between the conical cylinder (15) and the annular cylinder (16) adjacent thereto and gap between two adjacent annular cylinders (16).

8. The cold-wall reactor according to claim 7, wherein a distance between the side wall of an annular cylinder (16) located above the cold hydrogen gas inlet (3) and the inner side wall of the reactor body (1) is smaller than a distance between the side wall of an annular cylinder (16) located below the cold hydrogen gas inlet (3) and the inner side wall of the reactor body (1).

9. The cold-wall reactor according to claim 1, wherein the inner liner cylinder (6) comprises
 a conical cylinder (15), with its top being connected with the reaction product outlet (2) in a sealing manner, and
 a plurality of annular cylinders (16), arranged in a sequence from top to bottom below the conical cylinder (15),
 wherein the first circulation channel (10) refers to the cavity (9) defined by a side wall of the annular cylinder (16) and the inner side wall of the reactor body (1), and
 wherein the second circulation channel (11) comprises gap between the conical cylinder (15) and the annular cylinder (16) adjacent thereto and gap between two adjacent annular cylinders (16).

10. The cold-wall reactor according to claim 9, wherein a distance between the side wall of an annular cylinder (16) located above the cold hydrogen gas inlet (3) and the inner side wall of the reactor body (1) is smaller than a distance between the side wall of an annular cylinder (16) located below the cold hydrogen gas inlet (3) and the inner side wall of the reactor body (1).

11. The cold-wall reactor according to claim 9, wherein the annular cylinder (16) is provided with a first air hole (13) arranged on its side wall corresponding to the cold hydrogen gas inlet (3), and a second air hole (14) arranged on its side wall corresponding to the first air hole (13).

12. The cold-wall reactor according to claim 1, wherein the reactor body (1) is a vertical cylinder body.

13. The cold-wall reactor according to claim 12, wherein
 the housing (5) has a thickness of 60-300 mm,
 the surfacing layer (18) has a thickness of 4-15 mm,
 the thermal insulation liner (17) has a thickness of 100-200 mm, and
 the inner liner cylinder (6) has a wall thickness of 5-15 mm.

14. The cold-wall reactor according to claim 1, wherein the reactor body (1) has a tapered inner bottom with its tip facing the feed inlet (4) and its base facing the bottom of the inner liner cylinder (6).

* * * * *